US008531450B2

(12) United States Patent
Falco, Jr. et al.

(10) Patent No.: US 8,531,450 B2
(45) Date of Patent: Sep. 10, 2013

(54) USING TWO DIMENSIONAL IMAGE ADJUSTMENT OPERATIONS ON THREE DIMENSIONAL OBJECTS

(75) Inventors: Peter F. Falco, Jr., Saratoga, CA (US); Michael O. Clifton, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1108 days.

(21) Appl. No.: 12/200,644

(22) Filed: Aug. 28, 2008

(65) Prior Publication Data

US 2013/0120354 A1   May 16, 2013

(51) Int. Cl.
*G06T 19/00* (2011.01)
(52) U.S. Cl.
USPC .......................................... 345/419; 345/426
(58) Field of Classification Search
None
See application file for complete search history.

(56) References Cited

U.S. PATENT DOCUMENTS

| | | | |
|---|---|---|---|
| 5,864,313 A | 1/1999 | Speck et al. | |
| 6,184,890 B1 | 2/2001 | Naughton et al. | |
| 6,404,435 B1 | 6/2002 | Miller et al. | |
| 6,512,522 B1 | 1/2003 | Miller et al. | |
| 6,862,024 B2 * | 3/2005 | Perry et al. | 345/420 |
| 6,947,057 B2 | 9/2005 | Nelson et al. | |
| 7,061,485 B2 * | 6/2006 | Tanguay et al. | 345/419 |
| 7,142,726 B2 * | 11/2006 | Ziegler et al. | 382/285 |

OTHER PUBLICATIONS

Steven M. Seitz and Kiriakos N. Kutulakos, "Plenoptic Image Editing", Proc. 6th Int. Conf. Computer Vision, 1998, pp. 17-24.*
Mohamed Adel Samy Shalaby, "Evaluating Lightscape's Accuracy for Predicting Daylighting Illuminance Compared to an Actual Space," 2002.*
Authorization_of_Examiners_Amendment_071813.*
B792_drafted_amendment_071813.*

* cited by examiner

*Primary Examiner* — Kee M Tung
*Assistant Examiner* — Sing-Wai Wu
(74) *Attorney, Agent, or Firm* — Wolfe-SBMC

(57) ABSTRACT

A method, system, and computer-readable storage medium for using a two dimensional image adjustment operations to modify a three dimensional object. A first representation of a three dimensional model may be rendered using three dimensional rendering effects. A second representation of the model may be rendered without using the three dimensional rendering effects. The first representation may be displayed. Input may be received to apply an image adjustment operation to the first representation. The image adjustment operation may be applied to the second representation. At least a portion of the first representation may be re-rendered using the three dimensional rendering effects. The modified first representation may be displayed.

27 Claims, 3 Drawing Sheets

USING TWO DIMENSIONAL IMAGE ADJUSTMENT OPERATIONS ON THREE DIMENSIONAL OBJECTS

FIELD OF THE INVENTION

The present invention is directed to image manipulation; and more particularly to a method for using two dimensional image adjustment operations to modify a three dimensional object.

BACKGROUND

Description of the Related Art

In recent years, image manipulation and graphical editing programs have become increasingly popular. These editing environments typically allow for the use of various two dimensional tools (e.g., drawing tools, brush tools, water tools, blurring tools, etc.), effects, and operations for manipulating two dimensional images.

As computing power has increased, the popularity and accessibility of three dimensional models and images have also increased. The graphical editing environments or programs mentioned above have accordingly incorporated the ability to manipulate three dimensional images, e.g., using tools specifically designed for modifying representations of three dimensional objects or models. However, the existing two dimensional tools and manipulation operations are not compatible with these three dimensional objects or models.

SUMMARY

Various embodiments are presented of systems, methods, and computer-readable storage media for using two dimensional image adjustment operations to modify a three dimensional object.

A first representation of a three dimensional model may be rendered using three dimensional rendering effects. The first representation may be a two dimensional representation. A second representation of the three dimensional model may be rendered without using the three dimensional rendering effects. Similar to the first representation, the second representation may be a two dimensional representation.

The first representation may be presented or displayed on a display. Input (e.g., user input) may be received to apply an image adjustment operation to the first representation. The image adjustment operation may be applied to the second representation based on the input. At least a portion of the first representation may be re-rendered based on a result of applying the image adjustment operation to the second representation. Re-rendering the first representation may include using the three dimensional rendering effects and may produce a modified first representation. The modified first representation may be presented on the display.

Figure 1:
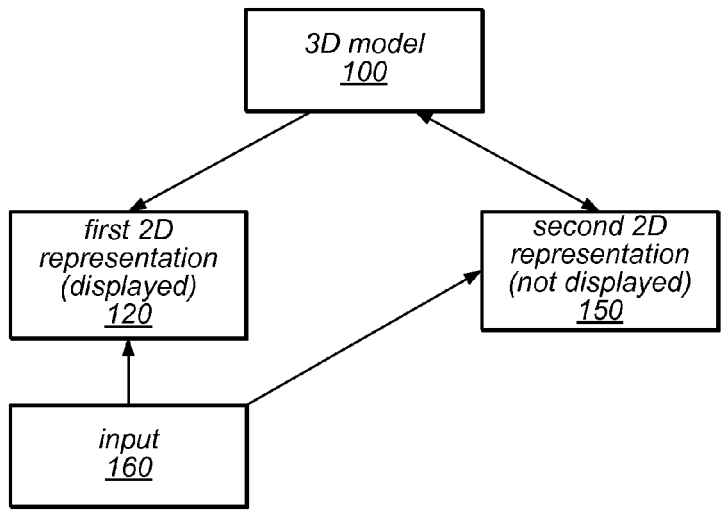
FIG. 1 is a block diagram illustrating an exemplary flow of operations, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Image editing may be defined as the process of altering digital images or illustrations. Digital image editing applications, executed on a computing device, may be the primary tool used to manipulate, enhance, transform, create and render images, such as digital photographs and computer art. Example implementations of image editing applications include Adobe Photoshop™ and Adobe Photoshop Express™, among other image editing programs. Image editors are widely used to perform transformation or image adjustment operations on digital images, such as rotating, cropping and selectively changing colors. Many other operations are possible. For example, digital image editing applications may be used to render and modify three dimensional objects or images, e.g., according to various embodiments described herein.

More specifically, the methods and systems described herein are directed towards an image editing application which may allow for the use of two dimensional image adjustment operations to modify a three dimensional object. As used herein "image adjustment operations" may refer to a wide variety of operations which may modify or otherwise change an image or representation. For example, image adjustment operations may include transformations using various tools which may be provided in a palette of the image editing application. For example, the tools may include a brush tool, a sketch tool, a blur tool, airbrush tool, eraser tool, paint bucket tool, text tool, sponge tool, and/or other tools. Thus, use of the tools on an image or representation may result in an image adjustment operation being performed on the image or representation. Image adjustment operations may also include filter or merge operations (e.g., when combining multiple layers in an image). "Two dimensional image adjustment operations" refer to those image adjustment operations which may be applied to two dimensional objects (e.g., layers, images, etc.), but may not be compatible with three dimensional objects. In other words, while the two dimensional image adjustment operations may be used to modify two dimensional images or layers, they may not be natively compatible with three dimensional objects, renderings, etc. Various embodiments described herein may allow for the use of these two dimensional image adjustment operations on three dimensional models or objects.

FIG. 1

FIG. 1 is a block diagram illustrating an exemplary flow of operations, according to various embodiments. As shown, a three dimensional (3D) model 100 may be created and/or stored, e.g., in a computer accessible memory medium. The 3D model 100 may be any of various models. For example, the 3D model may model any 3D object, including, but not limited to glasses, tables, houses, faces, people, animals, etc. 3D models are typically stored as a data structure in memory which may describe a wire frame or series of connected polygons which form the surface of the object being modeled, although other 3D models may describe the entire volume of the object.

3D models may be used to render two dimensional objects, e.g., for visualization on a display. For example, as shown in FIG. 1, the 3D model 100 may be used to render a first two dimensional (2D) representation or rendering 120. The first 2D representation 120 may be displayed to a user, e.g., on the display of a computer system. For example, the user may be using an image editing application for manipulating the 3D model 100. Correspondingly, the image editing application may render the first 2D representation 120 for display within the image editing application for manipulation by the user. Note that when rendering the first 2D representation 120, various 3D rendering effects may be used. For example, the 3D rendering effects may include lighting effects, effects applied to the 3D model 100, shadow effects, reflection effects, transparency effects, indirect lighting effects, subsurface scattering effects, etc.

As a more specific example, the 3D model could model a human face, e.g., colored red, which may be in a 3D scene which includes various lighting sources and/or other objects. A lighting source may illuminate a left side of the human face within the scene, and the camera for the 3D scene may be positioned in front of the human. Note that this camera and light source information may be stored in a file which specifies the 3D scene. Thus, a 3D scene file may store information indicating lighting sources, camera angles, included 3D models, position information, and/or other information which specifies the 3D scene. Note further that the user may be able to specify or modify this information using the image editing application.

Correspondingly, the first 2D representation 120 may be rendered using the lighting effects and camera angle of the 3D scene. Correspondingly, the first 2D representation 120 may be displayed to the user. Since the lighting source illuminates the left side of the modeled face, the left side may be displayed (e.g., within the image editing application) as red and without any substantial shadows (although some of the red may be highlighted due to the light source, thereby possibly changing the red color to a brighter red). However, the right side of the face may not be red since, in this example, there is not a lighting source illuminating that side of the face. Correspondingly, the right side of the face may be displayed as a darker red, purple, grey, or black, depending on the degree of shadow. Thus, while the 3D model 100 may be specified as completely red, the first 2D representation may be rendered using three dimensional rendering effects (such as lighting effects), which may result in displayed colors that are different than the red specified by the 3D model 100. In other words, in this example, the completely red face may be displayed as red on the left side and varying degrees of red, purple, and black on the right side, due to the lighting effects of the light source. Additionally, the first 2D representation 120 may be rendered using blending of layers or properties (such as opacity information), e.g., of the 3D model 100, as well as the application of effects. Thus, the first 2D representation 120 may be rendered for display to the user using three dimensional rendering effects.

Separately, a second 2D representation 150 may be rendered from the 3D model 100, e.g., using the same camera source that was used to render the first 2D representation 120. The second 2D representation 150 may be rendered without the three dimensional rendering effects (such as the lighting effects). Thus, following the example above, the second 2D representation 150 may be completely red, as specified by the 3D model 100. In one embodiment, the first and second representations 120 and 150 may be rendered simultaneously (i.e., where at least a portion of the first 2D representation 120 and the second 2D representation 150 are being rendered at the same time), although in alternate embodiments, they may be rendered serially, or in other fashions. In one embodiment, the second 2D representation 150 may represent pixels in the desired map type and may not contain the color (or opacity, etc.) of the underlying layers or material of the 3D model 100. Additionally, the second 2D representation 150 may only include the data from the target layer and not from a composite of multiple layers. Note that in some embodiments, the first and second 2D representations may be stored in a "deep buffer" which may include typical color and alpha channel information as well as unmodified versions of these same pixels (e.g., corresponding to the second 2D representation 150).

The second 2D representation 150 may not be displayed to the user, but instead may be used to allow a user to apply 2D effects to the 3D model. For example, the user may provide input 160 to apply a 2D image adjustment operation to the 3D model. Since the user is viewing the first 2D representation 120 on the display, the input may be applied to the first 2D representation 120. As a specific example, the user may select a paint tool and specify a desired color, such as brown, in order to add hair to the modeled face (which is currently completely red, although displayed with varying colors due to the lighting effects). Thus, the user may apply the brown paint tool to the first 2D representation 120 provided on the display, as shown in FIG. 1 in 160. However, it should be noted that the input 160 may alternatively be programmatic or computer input rather than user input, according to various embodiments.

However, the image adjustment operation indicated by the input 160 may be applied to the second 2D representation 150 rather than the first 2D representation 120. Conceptually, the input applied to the displayed first 2D representation 120 (e.g., by the user) may be "intercepted" and actually applied to the second 2D representation 150. In turn, the 3D model 100 may be updated according to the modifications made to the second 2D representation 150 by the image adjustment operation. Finally, the first 2D representation 120 may be re-rendered based on the update to the 3D model 100. In some embodiments, only the modified portion of the 3D model 100 may be re-rendered to update the first 2D representation 120.

This method of operation offers several benefits over a single rendering (e.g., of the first 2D representation 120) and direct modification of the single rendering. Following the method of described above, the user may provide changes to the model using the "true" colors or properties of the 3D model 100. Following the example above, while the first 2D representation 120 may be displayed with a plurality of different colors resulting from the three dimensional rendering effects, the "true" color of the 3D model is red. Thus, when applying effects or image modifications using the image adjustment operation(s), the user simply applies them using desired "true" colors or properties of the 3D model rather than to the colors or properties displayed first 2D representation 120. This may allow the user to paint the hair on the modeled face using a single brown color and then seeing the resulting plurality of browns based on the three dimensional rendering effects. As another example, the user could apply a white color underneath the chin of the face, but since a portion of that area is heavily shadowed, it may be shown to the user in the first 2D representation 120 as dark (e.g., grey or black).

In the alternative technique of applying changes to the first 2D representation 120 (rather than to the second 2D representation 150 as described above), the actual modifications to the 3D model 100 would likely be unexpected and/or undesired by the user. Thus, by applying the changes to the second 2D representation 150, the user is provided a more natural and understandable way to edit the 3D model 100, and see the corresponding rendered image via the displayed first 2D representation 120. Said another way, the user may be able to apply modifications to the 3D model 100 in a manner that is immune to lighting or other effects, while still being able to get a sense for the 3D shape of the object. Additionally, this technique allows for the use of existing 2D tools and image adjustment operations (e.g., without modification) since the image adjustments are applied to a 2D representation (the second 2D representation 150) and then mapped to the 3D model 100.

FIG. 2

Figure 2:
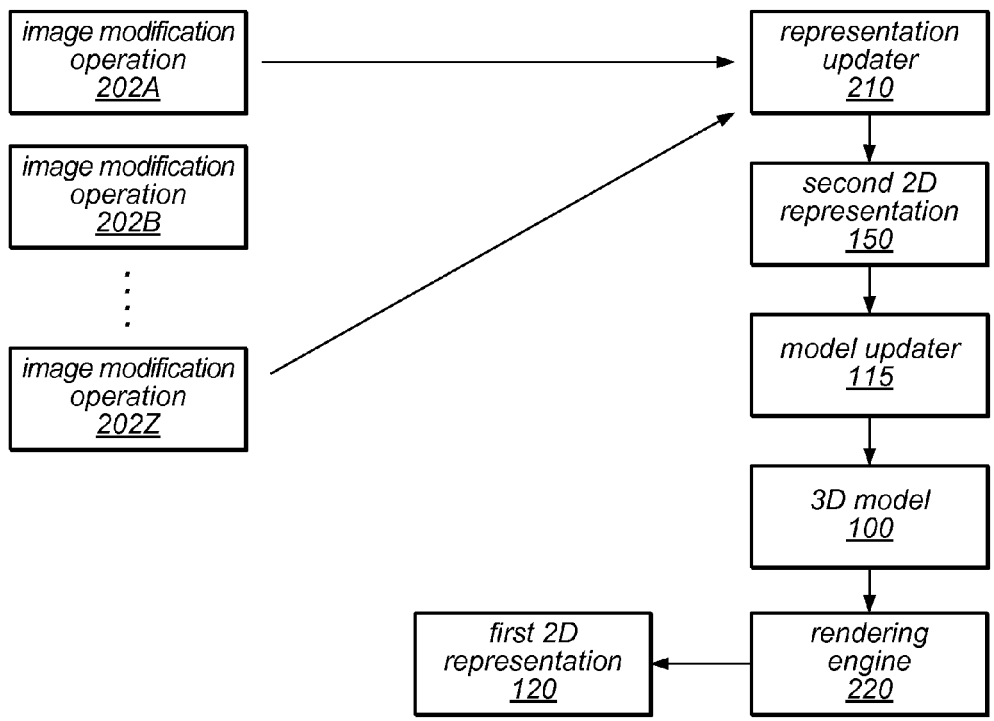
FIG. 2 is a logical block diagram of an exemplary system, according to one embodiment.

FIG. 2 is a block diagram illustrating various logical blocks that may be included in or executed in conjunction with an image editing application. As shown, there may be a plurality of image modification operations 202A-202Z. As indicated above, these image modification operations may include any operations which may modify an image, e.g., a 2D representation of the 3D model, although image modification operations for modifying a 3D model are also envisioned. Note that there may be any number of these image modification operations. As also indicated above, these image modification operations may be initiated via user input, e.g., applied to the first 2D representation 120.

As shown, representation updater 210 may update the second 2D rendering 150 based on the image modification operations 202. In other words, the image modification operations may be applied to the second 2D rendering 150 via the representation updater 210. The representation updater 210 may update the second 2D rendering 150 based on or in response to an event, e.g., initiated by user input to the first 2D representation 120. Accordingly, model updater 115 may map the changes from the second 2D rendering 150 to the 3D model 100. Thus, the changes applied to the second 2D rendering 150 (based on the image modification operations 202) may be correspondingly applied to the 3D model 100 in a 3D fashion. Finally, the rendering engine 220 may render the first 2D representation 120 from the 3D model using 3D rendering effects. Note that the rendering engine 220 may only render those portions of the first 2D representation 120 that have changed (e.g., as identified by the representation updater 210, the model updater 115, and/or the rendering engine 220, among other possible modules. Note that the second 2D rendering may be similarly re-rendered by the rendering engine 220 in some embodiments.

Figure 3A:
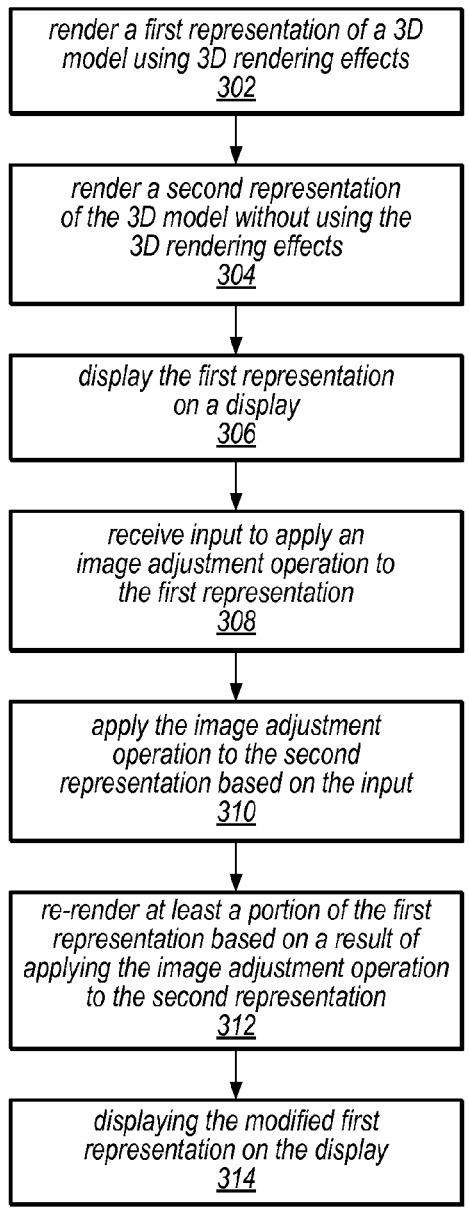
FIGS. 3A-3C are flowcharts illustrating an exemplary method for using two dimensional image adjustment operations to modify a three dimensional object, according to some embodiments.
Figure 3B:
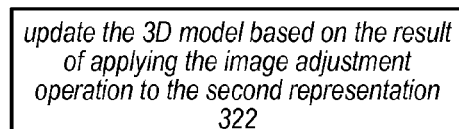
Figure 3C:
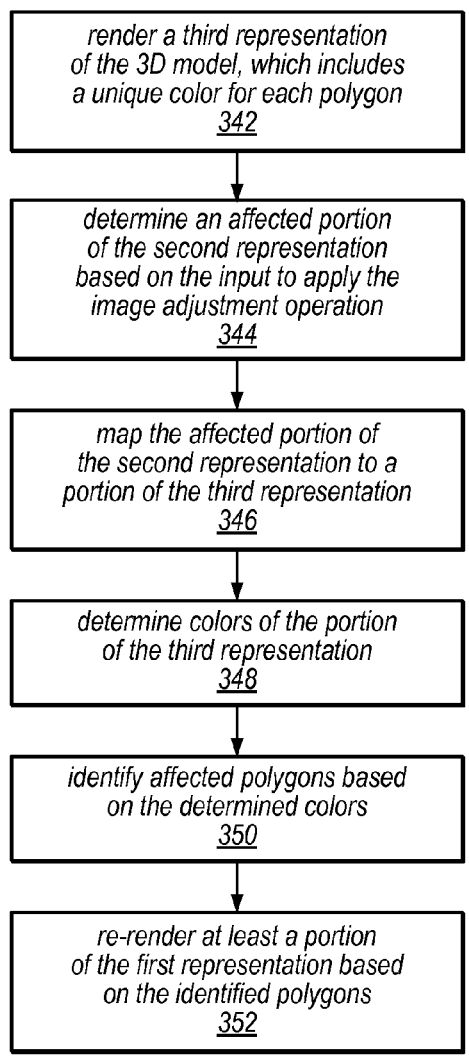

FIGS. 3A-3C—Method for Using 2D Image Adjustment Operations on 3D Objects

FIGS. 3A-3C are block diagrams illustrating some embodiments of a method for using 2D image adjustment operations on 3D objects. The method shown in FIGS. 3A-3C may be used in conjunction with any of the computer systems, devices, or circuits shown or described herein, among other devices. In various embodiments, some of the method elements shown may be performed concurrently, performed in a different order than shown, or omitted. Additional method elements may also be performed as desired. As shown, this method may operate as follows.

In 302 of FIG. 3A, a first representation of a 3D model may be rendered using 3D rendering effects. As indicated above the first representation of the 3D model may be a 2D representation, e.g., for presentation on a display. For example, the 2D representation could be an image comprising a plurality of layers or simply a single layer. In some embodiments, the 2D representation may be an Adobe Photoshop™ image file, a JPEG file, an IMG file, a BMP file, among other image file types. However, it is also envisioned that the first representation of the 3D model could also be a 3D representation, e.g., stored according to various 3D representation formats. Additionally, the 3D rendering effects may include lighting effects, effects applied to the 3D model, etc. Thus, the first representation of the 3D model may be rendered with 3D rendering effects and may be stored in memory, e.g., in a buffer of an image editing application.

In 304, a second representation of the 3D model may be rendered without using the 3D rendering effects. As indicated above, and similar to the first representation, the second representation of the 3D model may be a 2D representation. For example, the 2D representation could be an image comprising a plurality of layers or simply a single layer. In some embodiments, the 2D representation may be an Adobe Photoshop™ image file, a JPEG file, an IMG file, a BMP file, among other image file types. Thus, the second representation of the 3D model may be rendered without 3D rendering effects and may be stored in memory, e.g., in a buffer of the image editing application, such as the buffer storing the first representation of the 3D model.

In 306, the first representation may be displayed, e.g., on a display. For example, the first representation may be provided for display on a user's computer monitor, e.g., within an image editing application. However, in alternate embodiments, where the first representation may be a 3D representation, the first representation may be displayed using various 3D display methods, e.g., as a hologram, within a virtual reality, using a stereoscopic display, and/or using any of various 3D visualization techniques.

In 308, input may be received to apply an image adjustment operation to the first representation. For example, a user may select a particular image manipulation tool, such as a paint tool from a palette of available tools in the image editing application. The selected tool may be used to apply a particular effect or pixel manipulation to an image. For example, the paint tool may apply a selected color to an image using a selected brush type. Thus, the user may select a tool and use the tool on the displayed first representation, e.g., within the image editing application, in order to apply the image adjustment operation. In some embodiments, some or all of the tools may be two dimensional image adjustment tools, which may be designed for use on 2D representations or images rather than 3D representations. However, other embodiments besides painting tools are envisioned. For example, the user may apply various filters, apply merging operations (e.g., for a plurality of overlapping layers), and/or other operations which modify the image. Thus, the image adjustment operation may include use of a 2D image adjustment operation tool, a 2D filter operation, a 2D layer merge operation, etc. Additionally, as noted above, the input may not only be user input, but may also be (in addition or as an alternative) computer or programmatic input.

In 310, the image adjustment operation may be applied to the second representation, e.g., based on the input of 308. In other words, while the input may apply the effect to the first representation, e.g., by visually applying an image adjustment tool to the first representation, the image adjustment operation may actually be applied to the second representation. Thus, because the second image representation is rendered without 3D rendering effects, the image adjustment operation may effect the color or properties of the 3D model in their true or source natures, rather than with lighting effects or other rendering effects, thus providing the user a more natural and predictable way to modifications to the 3D model.

Additionally, as already indicated, this particular method allows 2D image modification techniques or operations to be used to modify the 3D model.

In 312, at least a portion of the first representation may be re-rendered based on a result of applying the image adjustment operation to the second representation. In re-rendering the first representation, the three dimensional rendering effects may again be used. In some embodiments, the re-rendering may be performed from the 3D model (based on a modification to the 3D model, as described in FIG. 3B below) or may be performed directly from the image adjustment operation applied to the second representation, among other possibilities. Thus, based on the image adjustment operation applied to the second representation, the first representation may be re-rendered to produce (and in 314, display) a modified first representation, thereby providing feedback to, for example, the user in an interactive fashion. In other words, a user may provide input to apply an image modification operation to the first representation, the image modification operation may be actually applied to the second representation, and the first representation may be modified based on the application to update the first representation (e.g., visually, on the display, for the user). In some embodiments, the entire first representation may be re-rendered, only a portion may be re-rendered, or only the portion of the first representation that changed may be re-rendered (e.g., for efficient operation and responsiveness).

FIG. 3B

FIG. 3B provides further details regarding one embodiment for re-rendering the first representation. More specifically, in 322, the 3D model may be updated based on the result of applying the image adjustment operation to the second representation in 310. More specifically, the changes made to the second representation may be mapped or applied to the 3D model. Thus, the input provided to the first representation may be applied to the second representation which may then be mapped to the 3D model, thereby updating the 3D model according to, for example, a user's desired change to the 3D model/first representation of the 3D model. Since the second representation and the 3D model are not affected by the 3D rendering effects, the mapping of the changes may not require any transformations of the changes (e.g., the applied color changes) themselves. In some embodiments, the mapping of the changes from the 2D representation to the 3D model may be a reverse projection of the 2D representation onto the 3D model, and a corresponding modification of the 3D model. Thus, modification to the second representation based on the application of the image adjustment operation may be mapped to the 3D model.

In 324, similar to 312 above, at least a portion of the first representation may be re-rendered based on the update to the 3D model. For example, a portion or all of the first representation may be re-rendered from the updated 3D model. In some embodiments, the method may include determining an affected portion of the 3D model based on the application of the image adjustment operation to the second representation and only re-rendering that portion of the 3D model in 324. Thus, the first representation may be re-rendered based on the update to the 3D model from 322 above.

FIG. 3C

FIG. 3C provides further details regarding one embodiment for determining affected portions of the 3D model, e.g., to increase efficiency of the interactive editing process of the 3D model. In 342, a third representation of the 3D model may be rendered. The third representation of the 3D model may be rendered at the time the first and/or second representation is rendered or at a different time. In one embodiment, the first, second, and third representations may be rendered, e.g., concurrently, at a same time. The third representation may include a unique color for each polygon in the third representation. However, it should be noted that there may be a unique color for each polygon in the 3D model. Thus, each polygon in the third representation may have a unique color which is associated with a particular polygon of the 3D model. The mapping between the colors and the polygons of the 3D model may be stored in a color mapping file, according to one embodiment.

In 344, an affected portion of the second representation may be determined based on the input to apply the image adjustment operation. For example, the image editing application may determine which portion of the second representation is modified when the image adjustment operation is applied to the second representation.

In 346, the affected portion of the second representation may be mapped to a portion of the third representation. For example, in some embodiments, the second and third representation may be rendered in a similar fashion (e.g., using the same camera angle). Accordingly, the mapping process may be simple since the affected area of the second representation should exist in a very similar fashion in the third representation (e.g., except with different colors). For example, the polygons of the second and third representations may be substantially identical (other than, for example, the color differences already mentioned). However, the mapping process may be more complex where the two representations differ more significantly.

In 348, colors of the portion of the third representation may be determined. For example, each pixel in the identified portion of the third representation may be analyzed to determine the color for the pixel. Each identified color may then be stored.

In 350, affected polygons may be determined based on the determined colors of 348. In one embodiment, each identified color may be mapped to particular polygons of the 3D model to determine which polygons of the 3D model should be updated as well as which polygons of the 3D model should be re-rendered for the first representation in 352. More specifically, in 352, which provides more detail for this embodiment for 312 above, at least a portion of the first representation may be re-rendered based on the identified polygons.

Note that variations to the above described method is envisioned. For example, instead of using a third representation of the 3D model, a map file of each polygon to the second representation may be maintained rather than a third representation of the 3D model being rendered. In one embodiment, such a map may be used to map particular polygons in the second representation to polygons in the 3D model to determine which polygons in the 3D model are modified by the application of the image adjustment operation to the second representation. Thus, while the above described method uses a third representation of the 3D model with colors, other methods to map the changes of the 2D representation to the 3D model are envisioned.

FIG. 4

Figure 4:
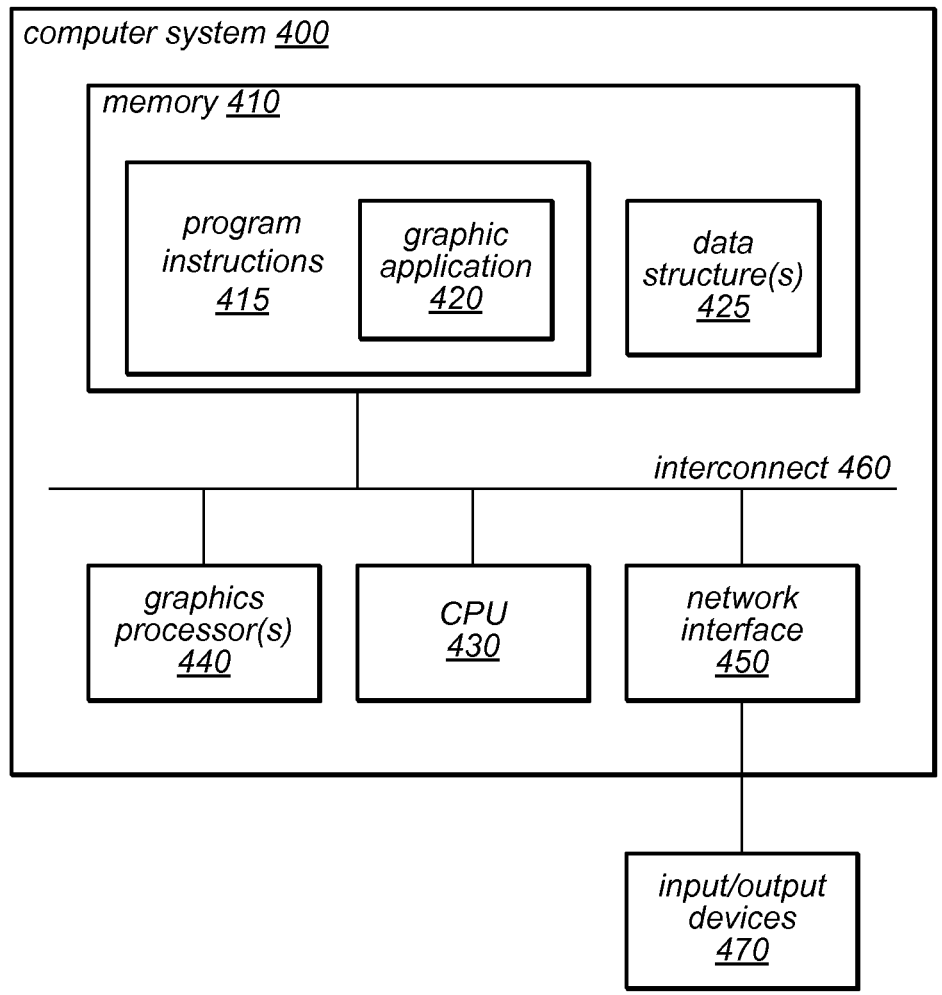
FIG. 4 illustrates an exemplary system configured to implement various embodiments described herein, according to one embodiment.

The techniques described herein may be implemented by a computer system configured to provide the functionality described, FIG. 4 is a block diagram illustrating on embodiment of a computer system 400 suitable for implementing such embodiments. A graphics editing program or application such as graphics application 420 may be configured to perform various embodiments described herein.

Graphics application 420 may represent various types of graphics applications, such as painting, publishing, photography, games, animation, and other applications. Additionally, graphics application 420 may utilize a graphics processor 440 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 440 may implement a number of graphics primitive operations in a way that makes executing them much faster than drawing directly to the screen with a host central processing unit (CPU), such as CPU 430. In various embodiments, the techniques disclosed herein may be implemented by program instructions configured for parallel execution on two or more such GPUs. The computer system 400 may implement one or more application programmer interfaces (APIs) that permit programmers to invoke the functionality of the GPU. Suitable GPUs may be commercially available from vendors such as NVIDIA Corporation, ATI Technologies, and others.

Functionality and/or features described herein as being part of, or performed by, graphics application 420 may, in some embodiments, be part of, or performed by, one or more graphics processors, such as graphics processor 440.

Various embodiments, as described herein, may be implemented on various types of computer systems. Referring again to FIG. 4, computer system 400 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 420, which may be configured to implement the techniques described herein, may be provided as a computer program product, or software, that may include a computer-readable storage medium having stored thereon instructions, which may be used to program a computer system (or other electronic devices) to implement embodiments described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 4, computer system 400 may include one or more processor units (CPUs) 430. Processors 430 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 400, such as various versions of Unix, Linux, Windows™ from Microsoft Corporation, MacOS™ from Apple Corporation, or any other operating system that enables the operation of software on a hardware platform.

The computer system 400 may also include one or more system memories 410 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 400 via interconnect 460. Memory 410 may include other types of memory as well, or combinations thereof. One or more of memories 410 may include program instructions 415 executable by one or more of processors 430 to implement aspects of embodiments described herein. Program instructions 415, which may include program instructions configured to implement graphics application 420, may be partly or fully resident within the memory 410 of computer system 400 at any point in time. Alternatively, program instructions 415 may be provided to GPU 440 for performing functionality described herein. In some embodiments, the techniques described herein may be implemented by a combination of program instructions 415 executed on one or more processors 430 and one or more GPUs 440, respectively. Program instructions 415 may also be stored on an external storage device (not shown) accessible by the processor(s) 430 and/or GPU 440, in some embodiments. Any of a variety of such storage devices may be used to store the program instructions 415 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 430 and/or GPU 440 through one or more storage or I/O interfaces including, but not limited to, interconnect 460 or network interface 450, as described herein. In some embodiments, the program instructions 415 may be provided to the computer system 400 via any suitable computer-readable storage medium including memory 410 and/or external storage devices described above. Memory 410 may also be configured to implement one or more data structures 425, such as one or more acceleration data structures and/or structures configured to store data representing one or more input images, output images, or intermediate images. Data structures 425 may be accessible by processor(s) 430 and/or GPU 440 when executing graphics application 420 or other program instructions 415.

As shown in FIG. 4, processor(s) 430 may be coupled to one or more of the other illustrated components by at least one communications bus, such as interconnect 460 (e.g., a system bus, LDT, PCI, ISA, or other communication bus type), and a network interface 450 (e.g., an ATM interface, an Ethernet interface, a Frame Relay interface, or other interface). The CPU 430, the network interface 450, and the memory 410 may be coupled to the interconnect 460. It should also be noted that one or more components of system 400 might be located remotely and accessed via a network.

As noted above, in some embodiments, memory 410 may include program instructions 415, comprising program instructions configured to implement graphics application 420, as described herein. Graphics application 420 may be implemented in various embodiments using any desired programming language, scripting language, or combination of programming languages and/or scripting languages, e.g., C, C++, C#, Java™, Perl, etc. For example, in one embodiment, graphics application 420 may be JAVA based, while in another embodiments, it may be implemented using the C or C++ programming languages. In other embodiments, graphics application 420 may be implemented using specific graphic languages specifically for developing programs executed by specialize graphics hardware, such as GPU 440. In addition, graphics application 420 may be embodied on memory specifically allocated for use by graphics processor(s) 440, such as memory on a graphics board including graphics processor(s) 440. Thus, memory 410 may represent dedicated graphics memory as well as general-purpose system RAM, in various embodiments. Memory 410 may in some embodiments also include a data store configured to store image data for one or more input images and/or output images, in various embodiments. Other information not described herein may be included in memory 410 and may be used to implement the methods described herein and/or other functionality of computer system 400.

Network interface 450 may be configured to enable computer system 400 to communicate with other computers, systems or machines, such as across a network. Network interface 450 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 400 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 450 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 440 may be implemented in a number of different physical forms. For example, GPU 440 may take the form of a dedicated graphics card, an integrated graphics solution and/or a hybrid solution. GPU 440 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 4, memory 410 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 440 and the rest of the computer system 400 may travel through a graphics card slot or other interface, such as interconnect 460 of FIG. 4.

Computer system 400 may also include one or more additional I/O interfaces, such as interfaces for one or more user input devices 470, or such devices may be coupled to computer system 400 via network interface 450. For example, computer system 400 may include interfaces to a keyboard, a mouse or other cursor control device, a joystick, or other user input devices 470, in various embodiments. Additionally, the computer system 400 may include one or more displays (not shown), coupled to processors 430 and/or other components via interconnect 460 or network interface 450. Such input/output devices may be configured to allow a user to interact with graphics application 420 to perform various image processing functionality described herein and/or to specify various parameters, thresholds, and/or other configurable options available to the user when using graphic application 420. It will be apparent to those having ordinary skill in the art that computer system 400 may also include numerous other elements not shown in FIG. 4.

Note that program instructions 415 may be configured to implement a graphic application 420 as a stand-alone application, or as a module of another graphics application or graphics library, in various embodiments. For example, in one embodiment program instructions 415 may be configured to implement graphics applications such as painting, publishing, photography, games, animation, and/or other applications. In another embodiment, program instructions 415 may be configured to implement the techniques described herein in one or more functions called by another graphics application executed on GPU 440 and/or processor(s) 430. Program instructions 415 may also be configured to render images and present them on one or more displays as the output of an operation and/or to store image data in memory 410 and/or an external storage device(s), in various embodiments. For example, a graphics application 420 included in program instructions 415 may utilize GPU 440 when performing methods described herein.

While various techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the description be interpreted to embrace all such variations and modifications.

What is claimed is:

1. A method, comprising:
   storing a three dimensional (3D) model that comprises data modeling one or more 3D objects;
   rendering, from the data for the 3D model, a first representation of the 3D model, the first representation comprising a two dimensional (2D) representation that is rendered using 3D rendering effects and at a particular camera angle;
   rendering, from the data for the 3D model, a second representation of the 3D model at the particular camera angle without using the 3D rendering effects, the second representation comprising a 2D representation;
   displaying the first representation on a display;
   receiving an input to the first representation to apply a 2D image adjustment operation to modify 2D objects and which is not natively compatible with 3D objects;
   applying the 2D image adjustment operation for the first representation to the second representation rather than the first representation;
   based on the 2D image adjustment operation applied to the second representation, re-rendering at least a portion of the first representation to generate a modified first representation configured to show a 3D result of the 2D image adjustment operation for the first representation using the 3D rendering effects; and
   displaying the modified first representation on the display.

2. The method of claim 1, wherein the 3D rendering effects comprise lighting effects.

3. The method of claim 1, wherein said receiving input to apply the 2D image adjustment operation to the first representation comprises receiving user input using a 2D image adjustment tool on the first representation.

4. The method of claim 1, wherein the 2D image adjustment operation comprises a 2D filter operation.

5. The method of claim 1, wherein the 2D image adjustment operation comprises a 2D layer merge operation.

6. The method of claim 1, further comprising updating the 3D model based on the 2D image adjustment operation applied to the second representation, wherein said re-rendering the first representation is based on the updated 3D model.

7. The method of claim 1, further comprising:
   determining an affected portion of the first representation based on said applying the 2D image adjustment operation to the second representation; and
   wherein said re-rendering the first representation comprises only re-rendering the affected portion of the first representation.

8. The method of claim 7, wherein said determining an affected portion of the first representation comprises:
   identifying affected polygons based on the 2D image adjustment operation being applied to the second representation; and
   wherein said re-rendering the first representation comprises only re-rendering the affected polygons.

9. The method of claim 7, further comprising:
   rendering a third representation of the 3D model, wherein the third representation comprises a unique color for each polygon in the third representation;
   wherein said determining an affected portion of the first representation comprises:
      determining an affected portion of the second representation based on the input to apply the 2D image adjustment operation;
      mapping the affected portion of the second representation to a portion of the third representation;
      determining colors of the portion of the third representation;
      identifying affected polygons based on said determining colors of the affected portion; and
   wherein said re-rendering the first representation comprises only re-rendering the affected polygons.

10. A computer readable storage medium device storing program instructions that, responsive to execution by a computer, cause the computer to:
    store a data model of one or more three dimensional (3D) objects of a 3D model;
    render, from the data for the 3D model, a first representation of the 3D model, the first representation comprising a two dimensional (2D) representation that is rendered using 3D rendering effects and at a particular camera angle;
    render, from the data for the 3D model, a second representation of the 3D model at the particular camera angle without using the 3D rendering effects, the second representation comprising a 2D representation;
    display the first representation on a display;
    receive an input to the first representation to apply a 2D image adjustment operation to modify 2D objects and which is not natively compatible with 3D objects;
    apply the 2D image adjustment operation for the first representation to the second representation rather than the first representation;
    re-render at least a portion of the first representation based on the 2D image adjustment operation applied to the second representation to generate a modified first representation that is configured to show a result of the 2D image adjustment operation for the first representation using the 3D rendering effects; and
    display the modified first representation on the display.

11. The storage medium device of claim 10, wherein the 3D rendering effects comprise lighting effects.

12. The storage medium device of claim 10, wherein said receiving input to apply the 2D image adjustment operation to the first representation comprises receiving user input using a 2D image adjustment tool on the first representation.

13. The storage medium device of claim 10, wherein the 2D image adjustment operation comprises a 2D filter operation.

14. The storage medium device of claim 10, wherein the 2D image adjustment operation comprises a 2D layer merge operation.

15. The storage medium device of claim 10, wherein the program instructions, responsive to execution by the computer, further cause the computer to update the 3D model based on the 2D image adjustment operation applied to the second representation, wherein said re-rendering the first representation is based on the updated 3D model.

16. The storage medium device of claim 10, wherein the program instructions, responsive to execution by the computer, further cause the computer to:
    determine an affected portion of the first representation based on said applying the 2D image adjustment operation to the second representation;
    wherein said re-rendering the first representation comprises only re-rendering the affected portion of the first representation.

17. The storage medium device of claim 16, wherein said determining an affected portion of the first representation comprises:
    identifying affected polygons based on the 2D image adjustment operation applied to the second representation;
    wherein said re-rendering the first representation comprises only re-rendering the affected polygons.

18. The storage medium device of claim 16, wherein the program instructions, responsive to execution by the computer, further cause the computer to:
    render a third representation of the 3D model, wherein the third representation comprises a unique color for each polygon in the third representation;
    wherein said determining an affected portion of the first representation comprises:
        determining an affected portion of the second representation based on the input to apply the 2D image adjustment operation;
        mapping the affected portion of the second representation to a portion of the third representation;
        determining colors of the portion of the third representation;
        identifying affected polygons based on said determining colors of the affected portion;
    wherein said re-rendering the first representation comprises only re-rendering the affected polygons.

19. A system, comprising:
    a memory and processor to implement an image editing application that is configured to:
        store a data model of one or more three dimensional (3D) objects of a 3D model;
        render, from the data for the 3D model, a first representation of the 3D model, the first representation comprising a two dimensional (2D) representation that is rendered using 3D rendering effects and at a particular camera angle;
        render, from the data for the 3D model, a second representation of the 3D model at the particular camera angle without using the 3D rendering effects, the second representation comprising a 2D representation;
        display the first representation on a display;
        receive an input to the first representation to apply a 2D image adjustment operation to modify one or more 2D objects and which is not compatible with one or more 3D objects;
        apply the 2D image adjustment operation for the first representation to the second representation rather than the first representation;
        based on the 2D image adjustment operation applied to the second representation, re-render at least a portion of the first representation to generate a modified first representation configured to show a result of the 2D image adjustment operation for the first representation using the 3D rendering effects; and
        display the modified first representation on the display.

20. The system of claim 19, wherein the 3D rendering effects comprise lighting effects.

21. The system of claim 19, wherein said receiving input to apply the 2D image adjustment operation to the first representation comprises receiving user input using a 2D image adjustment tool on the first representation.

22. The system of claim 19, wherein the 2D image adjustment operation comprises a 2D filter operation.

23. The system of claim 19, wherein the 2D image adjustment operation comprises a 2D layer merge operation.

24. The system of claim 19, wherein the program instructions are further executable to update the 3D model based on the 2D image adjustment operation applied to the second representation, wherein said re-rendering the first representation is based on the updated 3D model.

25. The system of claim 19, wherein the program instructions are further executable to:
    determine an affected portion of the first representation based on said applying the 2D image adjustment operation to the second representation;
    wherein said re-rendering the first representation comprises only re-rendering the affected portion of the first representation.

26. The system of claim 19, wherein said determining an affected portion of the first representation comprises:
    identifying affected polygons based on the 2D image adjustment operation applied to the second representation;
    wherein said re-rendering the first representation comprises only re-rendering the affected polygons.

27. The system of claim 19, wherein the program instructions are further executable to:
    render a third representation of the 3D model, wherein the third representation comprises a unique color for each polygon in the third representation;
    wherein said determining an affected portion of the first representation comprises:
        determining an affected portion of the second representation based on the input to apply the 2D image adjustment operation;
        mapping the affected portion of the second representation to a portion of the third representation;
        determining colors of the portion of the third representation;
        identifying affected polygons based on said determining colors of the affected portion;
    wherein said re-rendering the first representation comprises only re-rendering the affected polygons.

* * * * *